March 7, 1950 D. A. GAUTHIER 2,500,067
PNEUMATIC GAUGE
Filed Jan. 1, 1945 2 Sheets-Sheet 1

Inventor
Donat A. Gauthier
By G R McCrady
Attorney

March 7, 1950 D. A. GAUTHIER 2,500,067
PNEUMATIC GAUGE
Filed Jan. 1, 1945 2 Sheets-Sheet 2

Inventor
Donat A. Gauthier
By
A R McCrady
Attorney

Patented Mar. 7, 1950

2,500,067

UNITED STATES PATENT OFFICE 2,500,067

PNEUMATIC GAUGE

Donat A. Gauthier, Detroit, Mich.

Application January 1, 1945, Serial No. 570,907

14 Claims. (Cl. 73—37.5)

This invention relates to gages, and more particularly to gage apparatus designed for the precise measurement of dimensions.

The invention relates to that type of gage wherein a jet terminates in close proximity to the surface to be measured, and a stream of air or other fluid is discharged from the jet against the surface, the distance between the jet and the surface being indicated by a pressure indicating device connected anterior to the jet.

In my copending application S. N. 541,551, filed June 22, 1944, now abandoned, there is disclosed a gage of the type mentioned, wherein the pressure indicating apparatus consists of a manometer in the form of a simple U-tube, one leg of which is open to atmosphere and calibrated to permit the reading of the height of liquid within said leg. For purposes of precise measurement, in units of the order of one-one hundred thousandth of an inch, the manometer disclosed in said copending application is not sufficiently accurate, because of the fact that evaporation of the liquid or other disturbing factors may cause fluctuation in the liquid level, and thus cause false readings on the scale. It is also desirable that, for precise measurement, the pressure of the air or other fluid acting upon the manometer and the jet be more accurately controlled than is possible with the apparatus disclosed in said copending application.

The present invention aims to provide a manometer designed to register small fluctuations in the pressure of fluid supplied to the jet, the head of liquid in the manometer being maintained at a constant value despite loss or dissipation of the liquid from the manometer due to evaporation or other causes, or addition thereto due to condensation or other causes. The present invention also is designed to supply air or other fluid to the gage at more accurately controlled pressure than is possible with devices of the prior art.

An object of the invention is to provide a precision gage of the type described, having greater accuracy than similar gages of the prior art.

A further object of the invention is to provide a pressure indicating device, for use with such a gage or with other scientific instruments, wherein the liquid level in the device is maintained constant despite loss of or addition to the liquid through evaporation or other causes.

A further object of the invention is to provide an apparatus for registering gaseous pressures, which apparatus shall be of improved accuracy and reliability.

A further object of the invention is to provide apparatus for maintaining gaseous pressure in a chamber at accurate and predetermined value.

A further object of the invention is to provide improved means for maintaining liquid at a constant level.

A further object of the invention is to provide improved apparatus for indicating and measuring gaseous pressures, which apparatus shall be of improved construction and design, reliable in operation, and easily manufactured.

Further objects of the invention will become apparent from the following description, taken in connection with the appended drawings, in which:

Fig. 3 is a view in elevation of the apparatus shown in Fig. 1, as viewed from the left thereof.

Figure 1:
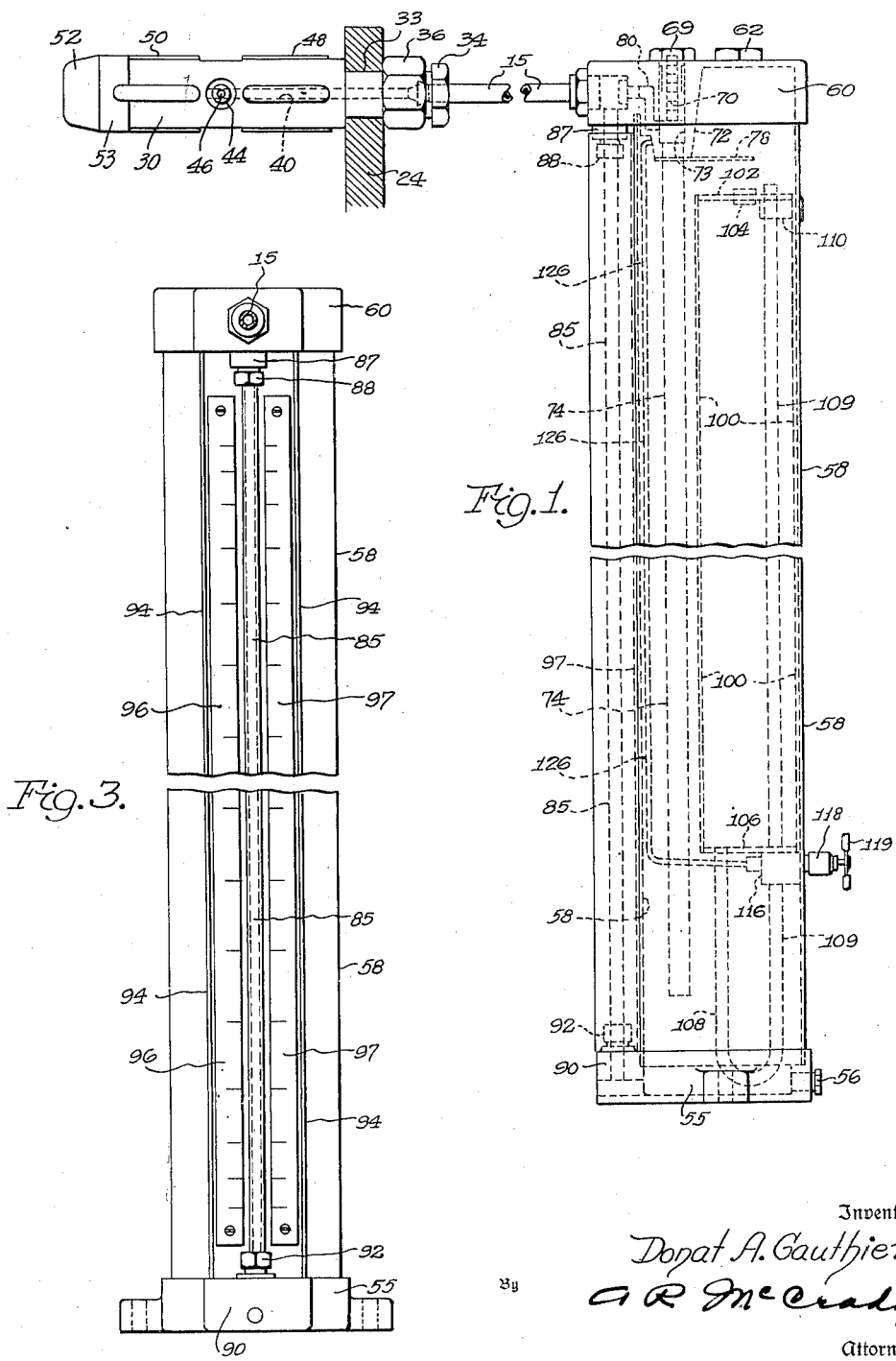
Fig. 1 is a view in elevation of a gage apparatus embodying the present invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

The operation of the gage disclosed herein depends upon the following principle: If a fluid under predetermined pressure is forced through a conduit having a pair of orifices in series with each other, the pressure of the fluid in the conduit between said orifices will be a function of the relative effective cross sections of the orifices; and if the anterior orifice is of known and constant cross section, a measurement of said pressure by means of a manometer or the like will indicate the effective cross section of the posterior orifice.

The device shown in the drawings comprises a gage head of the type disclosed in my copending application above identified, and mounted in a stationary standard 24 (Fig. 1), which maintains the axis of the head horizontal and spaced from the bench or other support by a sufficient distance to enable work to be applied thereto conveniently. The work may comprise a machined part having an internal bore which it is the function of the gage to measure, or may be any spaced parallel surfaces. The gage head, shown at the upper left of Fig. 1, comprises a shank 30, of generally cylindrical shape, formed of wear-resistant material and having a central longitudinal bore 40 which communicates by means of a conduit 15 with the pressure regulating apparatus described hereinafter. A nut 34 secures the conduit 15 to the gage head, and a second nut 36 secures the head to the standard 24. At the rear end of the gage head is a nipple 33 of reduced diameter, which passes through a horizontal aperture in the standard 24.

The bore 40 communicates adjacent the midsection of the shank with two horizontal cylindrical plugs 44 which terminate in oppositely extending jets 46, only one of such plugs and jets being shown in Fig. 1. The outer ends of jets 46 are ground to define a cylindrical surface which is concentric with the cylindrical outer surface of the shank 30, but of slightly greater diameter. To the rear of the jets 46 a series of hardened inserts 48 are provided at spaced intervals about the circumference of the head, and forwardly of the jets a similar set of inserts 50 are provided, leaving an interval between the two sets adjacent the jets 46. The inserts 48 and 50 project outwardly from the cylindrical surface of the shank 30, being secured in longitudinal grooves therein. The outer surfaces of the inserts are ground accurately to define a cylindrical surface of slightly greater dimension than shank 30.

The nose of the gage head comprises a tapered portion 52 at the forward end of the gage head, and a cylindrical portion 53, the outer surface of which coincides with the cylinder defined by the inserts 48, 50. The nose has the function of guiding the gage head into the bore to be measured, and of receiving the blows and shocks which occur when work is carelessly or hastily put upon the gage head, so as to maintain the remainder of the head to accurate dimensions for as long a time as is possible.

In the operation of the gage head, the piece to be measured, which may be any piece having opposed inner surfaces spaced from each other by a distance slightly exceeding that defined by the inserts 48, 50, is placed upon the gage head. There is thus a slight clearance between the outer surfaces of the inserts 48, 50 and the surfaces being measured, while a slightly greater clearance remains between the outer surfaces of the jets 46 and said surfaces. Air or other fluid being supplied to conduit 15 passes to the bore 40 and issues at jets 46 against the surfaces, forming therewith two circular orifices in parallel with each other. Since the jet outlets lie in close proximity to the surfaces being measured, a circular orifice is formed between the two, which restricts the outflow of fluid from the jets to a variable extent dependent upon the distance between the jet outlet and the surface; and since the diametral distance between the opposite jet outlets is known and constant, the restriction to the flow of fluid is a function of the distance between the surfaces being measured, and the back pressure in bore 40 is a function of the distance between said surfaces, so that a manometer connected to conduit 15 may be calibrated to read directly in linear increments of such diameter. The fluid discharged by the jets 46 flows freely to atmosphere through the spaces between the inserts 48, 50.

Instead of being used to measure the distance between two opposed surfaces, the gage may be used to measure the distance from a predetermined plane or point to a plane or curved surface, the position of the gage head in such case being fixed relative to such plane or point.

Figure 2:
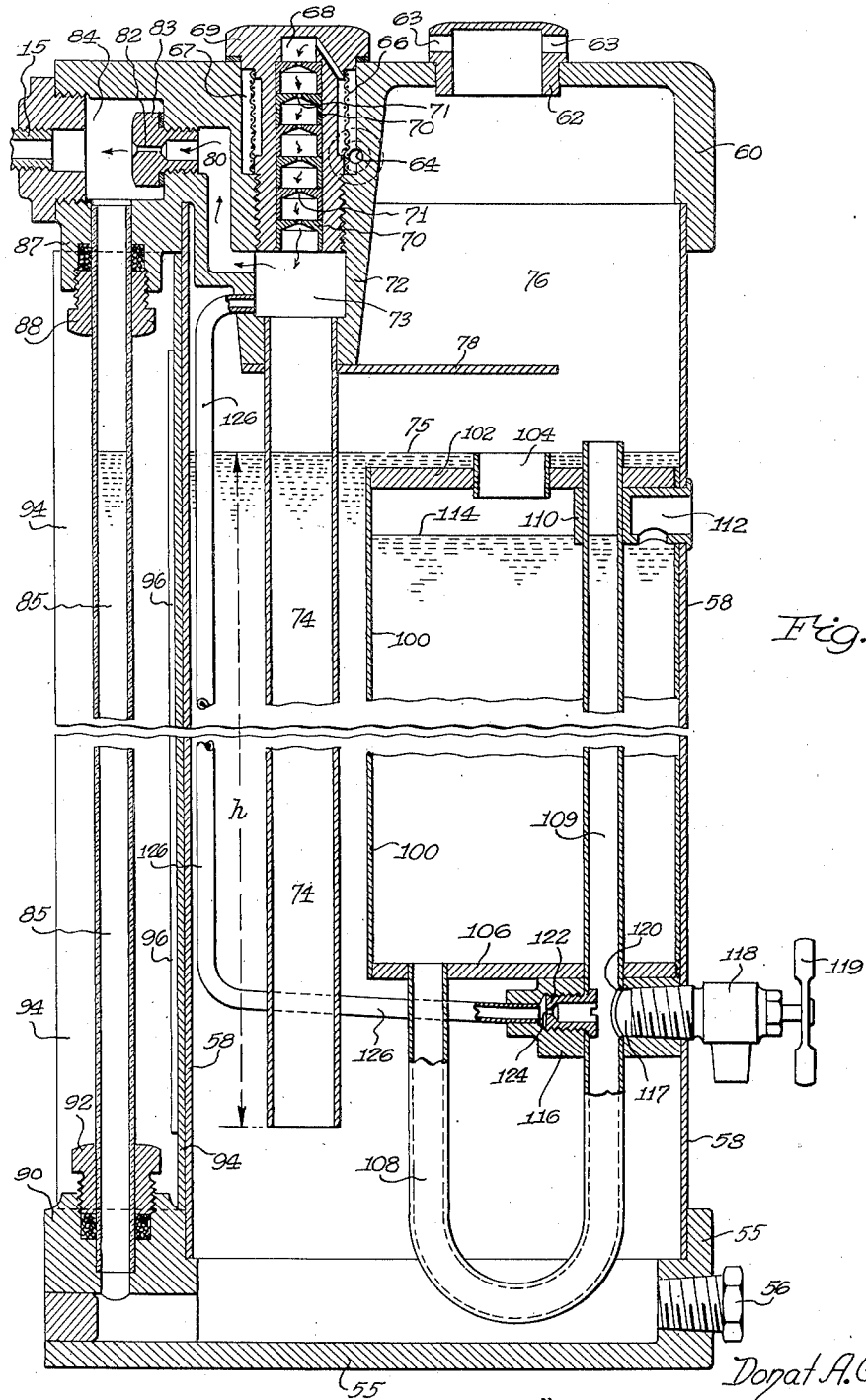
Fig. 2 is a view in vertical section of a portion of the apparatus shown in Fig. 1.

The apparatus now to be described constitutes means for supplying air or other gas to the gage head just described, and for registering the back pressure produced when the gage is in operation; it is shown at the right of Fig. 1, and in Figs. 2 and 3. It comprises a base 55 having a removable drain plug 56 therein, and a cylindrical tank 58, which may be of glass or sheet metal or other suitable material. The top of the tank 58 is covered by a metallic cover member 60, and a removable plug 62 is seated in an aperture in the cover member and provided with vent holes 63 so that the pressure within the tank is at atmospheric at all times.

Compressed air or other gas, supplied from any source of pressure which does not deviate too widely from a predetermined value, is led into the apparatus through an inlet port 64, whence it passes through a cylindrical filter 66 in an annular chamber 67 to the axial bore 68 of a plug 69. Within the bore 68 are seated a series of cup-shaped members 70, each of which is formed with an aperture 71 of such size as to restrict the flow of gas therethrough and damp out any fluctuations which may exist in the gaseous pressure supplied through the inlet port 64, and also to reduce the pressure supplied at the inlet port to a lower pressure suited to the smooth operation of the apparatus.

The plug 69 is threaded in a boss 72 formed integral with the cover member 60, and terminates in a chamber 73, the pressure in which is to be maintained constant in spite of fluctuations in the pressure supplied through inlet port 64, and in spite of fluctuations in chamber 84 caused by operation of the gage. A pipe 74 extends downwardly from chamber 73 in alignment with bore 68 to a point adjacent the bottom of the tank 58. By means hereinafter described, water or other liquid is maintained in the tank 58 at the level indicated by the reference numeral 75 in Fig. 2. It will be seen that when air pressure is applied through the port 64, the liquid within the pipe 74 will be displaced downwardly and, since the gaseous pressure is greater than the head of water at the bottom of the pipe, the gas will bubble out of the bottom of the pipe and escape into the space 76 at the upper portion of the tank 58 and thence to the atmosphere through the vent holes 63 or passage 112. The purpose of this arrangement is to permit the escape of excess gas and thus reduce the pressure in chamber 73 to that corresponding to the head of liquid indicated at $h$ in Fig. 2. A baffle 78 is secured to the boss 72 and extends horizontally within the space 76 to minimize the turbulence caused by the bubbles issuing from the lower end of the pipe 74.

Gas within the chamber 73 may also pass through a conduit 80 in the boss 72 to a calibrated restriction 82 formed in a plug 83 threaded into said conduit. Thence it may pass through a chamber 84 to the conduit 15 and thence to the gage head for the purpose above described.

The restriction 82 also communicates with a manometer comprising a glass tube 85 communicating directly with the chamber 84. Its upper end is seated in an extension 87 of the cover member 60 and is secured therein in gas-tight relation by means of a plug 88. The lower end of tube 85 is similarly seated in a boss 90 formed in the base of the tank, and is similarly held in place in gas-tight relation by means of a plug 92. The tube 85 thus constitutes one leg of a manometer, the other leg being the tank 58, which is of much greater cross-sectional area than the tube, so that fluctuations in the liquid level in the tube do not materially affect the liquid level in the tank. A shield 94, U-shaped in horizontal cross section, is secured to the tank 58 back of the tube 85. For purpose of indicating the liquid level in the tube, graduated scales 96, 97 are mounted within the shield 94 at opposite sides of the tube, one or both of them being preferably calibrated to read directly in linear dimensions of the measurement being made at the gage head. When so calibrated, the subdivisions of the scale are of unequal length, reaching a maximum at a point toward the lower portion of the tube, as shown in Fig. 3. It will be understood that the apparatus can with simple changes be adapted to supply gas to several gage heads, a separate manometer being used for each of such gage heads.

For the purpose of maintaining the liquid level within the tank 58 at the constant height indicated at 75, in spite of evaporation, condensation, or other factors, there is mounted within the tank 58 an inner tank indicated generally at 100. The inner tank has a cover member 102 through which passes an annular orifice member 104 the upper edge of which defines or determines the liquid level 75, and whereby liquid from the outer tank may overflow into the inner tank. The inner tank is also provided with a bottom member 106 in which is mounted one end of the shorter leg 108 of a recharging U-tube, the other leg 109 of which extends upwardly through the tank 100 and terminates above the cover member 102 in the vicinity of the orifice member 104. The leg 109 passes through a horizontal plug 110 positioned beneath the cover member 102 and extending to the exterior of tank 58 to serve as a support for the inner tank 100. The plug 110 is provided with a passage 112 as shown, so that it may act as an overflow vent for the tank 100, to prevent the liquid level within the tank 100 from rising above the line indicated at 114.

Below the bottom member 106 of the tank is mounted a drain plug 116, which may be so located as to form a support for the tank 100. The plug 116 is formed with a horizontal bore 117, at the outer end of which is mounted a cock 118 which may be manually opened by means of a handle 119 to drain out sediment or excess water. The cock 118 may also be removed bodily to permit a flexible wire to be inserted for cleaning out any obstruction in the passages.

The bore 117 communicates through an aperture 120 with the leg 109 of the U-tube. Opposite the aperture 120 there is mounted a plug 122 having a restricted orifice 124 therein. Beyond the orifice 124 is connected one end of a tube 126, which communicates with the chamber 73, so that gas may flow from the chamber 73 through the tube 126 and orifice 124 to the leg 109 of the U-tube.

In the operation of the device, the tank 58 is filled by pouring water or other liquid through the aperture in the cover member 60, the plug 62 being removed for this purpose. Liquid thus introduced into the tank 58 will first fill the same, and fill the manometer, to the level indicated by the line 75. Any additional liquid introduced into the tank will overflow the orifice member 104 and fill the tank 100, together with the U-tube 108, 109, the excess overflowing through the aperture 112 to the outside of the tank. The gage is then ready for operation.

As losses of liquid within the tank 58 occur through evaporation or otherwise, the liquid level 75 tends to drop, and to cause false readings in the manometer 85. This tendency is counteracted by the means now to be described.

During all of the time when the air pressure through the inlet port 64 is applied, as it will be during the time that the gage is in operation, gas will flow continuously downwardly through the pipe 74, issue as bubbles at the bottom of the tank, and escape through the vent holes 63, thereby maintaining the pressure in chamber 73 at a value corresponding to the head of liquid indicated at $h$ in Fig. 2. Gas will also flow downwardly through pipe 126 and will issue at a controlled rate through the restricted orifice 124 to form bubbles in the leg 109 of the recharging U-tube. The diameter of the U-tube is small enough that the bubbles formed therein will occupy the entire cross-section of the tube, and the U-tube extends downwardly far enough to preclude escape of such bubbles through the leg 108. The bubbles therefore move upwardly in tube 109, and in so doing pump or move upwardly ahead of them increments or slugs of liquid, on the principle of a coffee percolator, so that the bubbles escaping at the upper end of leg 109 force out ahead of them an intermittent discharge of liquid which is continuously withdrawn from the tank 100 and added to the tank 58 to maintain the liquid level therein at the constant value. Excess liquid discharged into tank 58 by this means, or formed therein by condensation of atmospheric moisture, will of course overflow the orifice member 104 and thus return to the tank 100; the net result of the operation will be that any loss of liquid through evaporation or otherwise will be made good from the liquid within tank 100, while the liquid level 75 will remain constant. The liquid level 75 in tank 58 will, under certain conditions of temperature and humidity, tend to rise due to the condensation of moisture from the air or other gas issuing from apertures 71, and will cause overflow into tank 100 and thence overflow through passage 112; but under other conditions the level 114 will gradually lower until, after a period of perhaps days or weeks, it is entirely exhausted, and the level within the recharging U-tube 108, 109 becomes so low that compressed gas escaping through the orifice 124 does not cause liquid to be discharged out of leg 109, but escapes freely into the space 76. When this point is reached, any further loss of water from tank 58 will not be replenished, but will cause a drop in the level 75, which will cause the manometer to read incorrectly, and water must again be added to tank 58. The condition just described can be ascertained by opening the cock 118, which will apprise the operator that the liquid is exhausted and needs replenishing.

Although the invention has been described with particular reference to the illustrated embodiment, it may be embodied in other forms and applied to many other uses. The apparatus may be used not only for the measurement of dimensions at the gage head, but is useful independently of the gage head for maintaining a constant liquid level, as at 75, and for maintaining a constant gaseous pressure, as in chamber 73. It may also be used for determining or calibrating the effective cross-section of an orifice placed in conduit 15. Further uses and adaptations of the invention will suggest themselves to those skilled in the art of mensuration and scientific

I claim:

1. Apparatus for preventing gas pressure in a chamber from exceeding a predetermined maximum, comprising a restricted inlet for admission of gas under pressure to said chamber, a container for liquid, an outlet from said chamber extending to a point below the liquid level in said container, a second container connected to receive liquid from the first container when the same reaches a predetermined level, and means utilizing gas under pressure from said chamber to cause a flow of liquid from the second container to the first container to maintain said liquid level constant.

2. Apparatus for preventing gaseous pressure in a chamber from exceeding a predetermined maximum, comprising a restricted inlet for admission of gas under pressure to said chamber, a restricted outlet from said chamber, a container for liquid, an unrestricted outlet from said chamber extending to a point below the liquid level in said container, a second container connected to receive liquid from the first container when the same reaches a predetermined level, and means utilizing gas under pressure from said chamber to cause return of liquid from the second container to the first container to maintain said liquid level constant.

3. Apparatus for preventing gaseous pressure in a chamber from exceeding a predetermined maximum, comprising a calibrated inlet to said chamber, a calibrated outlet from said chamber, a container supplied with sealing liquid and open to atmosphere, a second outlet from said chamber extending to a point below the liquid level in said container, a second container within the first container and connected to receive liquid therefrom when the same reaches a predetermined level in the first container, and means utilizing gas under pressure to cause return of liquid from the second container to the first container, said means comprising a U-tube connecting the second container to the first container and a conduit leading from said chamber to said U-tube.

4. Apparatus for preventing gaseous pressure in a chamber from exceeding a predetermined maximum, comprising a restricted inlet to said chamber, a restricted outlet from said chamber, a container supplied with sealing liquid, an unrestricted outlet from said chamber extending downwardly to a point below the liquid level in said container, a second container connected to receive liquid from the first container when the same reaches a predetermined level, means utilizing gas under pressure from said chamber to cause return of liquid from the second container to the first container to maintain said liquid level constant, and a manometer connected to the gaseous pressure posterior to said outlet and communicating with the first container.

5. Apparatus for preventing gaseous pressure in a chamber from exceeding a predetermined maximum, comprising a restricted inlet to said chamber, a container supplied with sealing liquid, an outlet from said chamber extending to a point below the liquid level in said container, a second container connected to receive excess liquid from the first container when the same reaches a predetermined level, and means for returning liquid from the second container to the first container to maintain said liquid level constant, said means comprising a conduit communicating with the lower portion of the second container and with the first container above said liquid level, and a conduit for gaseous pressure leading from said chamber to the lower portion of said first conduit.

6. Apparatus for preventing gaseous pressure in a chamber for exceeding a predetermined maximum, comprising a restricted inlet to said chamber, a restricted outlet from said chamber, means for indicating the gaseous pressure posterior to said outlet, a container supplied with sealing liquid and open to atmosphere, an unrestricted outlet from said chamber extending to a point below the liquid level in said container, a second container mounted within the first container and connected to receive excess liquid from the first container when the same reaches a predetermined level, and means utilizing the gaseous pressure in said chamber to return liquid from the second container to the first container to maintain said liquid level constant, said means comprising a U-tube having one leg connected to the bottom of the second container and its other leg connected to the first container and extending to a point above said liquid level, and a restricted conduit leading from said chamber to a point in said U-tube adjacent the bottom of the second container.

7. The invention defined in claim 6, comprising in addition an overflow connection from the second container, a drain cock connected to said U-tube, and said drain cock comprising a removable plug permitting access to said conduit.

8. Apparatus for maintaining constant liquid level, comprising a liquid container having an overflow defining the maximum liquid level in said container, a second container receiving liquid from said overflow, a conduit leading from the bottom portion of said second container thence downwardly and thence upwardly and terminating at a point above the liquid level in the first container, and a restricted orifice for introducing gas from a source under substantially constant pressure in the upwardly extending leg of said conduit at a point adjacent the bottom of the second container to cause flow of liquid upwardly therethrough.

9. Apparatus for maintaining constant liquid level, comprising a liquid container having an overflow defining the highest liquid level in the container, a second liquid container receiving liquid from said overflow and having an overflow at a level below that of the first overflow, a conduit leading from the second container downwardly a sufficient distance to prevent backflow of bubbles therethrough and thence upwardly and terminating at a point above the liquid level in the first container, and a restricted orifice for introducing gas from a source at substantially constant pressure into the upwardly extending leg of said conduit at a point slightly below the bottom of said second container to transfer liquid from the second container to the first container.

10. Apparatus for controlling gaseous pressure upon a calibrated orifice, comprising a conduit for gas under pressure connected to said orifice, a relief outlet connected to said conduit anterior to said orifice, means for maintaining a constant head of liquid at said outlet including a liquid container and means utilizing gas from said conduit for continuously replacing liquid lost from said container, and a manometer comprising a U-tube one leg of which is connected posterior to said orifice and the other leg of which is formed by said container.

11. Apparatus for controlling gaseous pressure in a chamber, comprising a restricted inlet to said chamber, a calibrated outlet from said chamber, a container for liquid open to atmosphere, a second outlet from said chamber extending to a point below the normal liquid level in said container, a second container within the first container, a connecting orifice permitting overflow from the first container to the second container and defining the normal liquid level in the first container, and means utilizing gaseous pressure in said chamber to cause return of liquid from the second container to the first container, said means comprising a U-tube having its one leg connected adjacent the bottom of the second container and its other leg extending to a point in the first container above said normal liquid level, and a conduit leading from said chamber to said other leg.

12. Apparatus for controlling gaseous pressure comprising a chamber, a gas inlet to said chamber, a calibrated outlet from said chamber, a liquid container having an overflow defining the normal liquid level in the container, a second liquid container receiving liquid from said overflow and having an overflow at a level below that of the first overflow, a conduit leading from a point adjacent the bottom of the second container thence downwardly and thence upwardly and terminating at a point above said normal liquid level in the first container, and an orifice in the upwardly extending leg of said conduit connected to said chamber for introducing gas into said leg to transfer liquid from the second container to the first container.

13. A pressure regulator comprising a conduit for compressed gas, a plurality of calibrated restrictions in series in said conduit, a liquid container having an overflow orifice, a gas relief passage leading from a point in said conduit intermediate two of said restrictions to a point in said container below said orifice, and a pump supplying liquid to said container and actuated by gas from said conduit intermediate two of said restrictions.

14. A pressure regulator comprising a chamber having a restricted outlet, an inlet conduit for compressed gas connected to said chamber, a liquid container having an overflow outlet, a relief passage connecting said chamber to said container at a point below the level of said overflow outlet, a source of liquid, and a pump supplying liquid from said source to said container and actuated by gas supplied by said conduit.

DONAT A. GAUTHIER.

REFERENCES CITED

The following references are of record in the file of this patent:

UNITED STATES PATENTS

| Number | Name | Date |
|---|---|---|
| 1,181,726 | Bishop | May 2, 1916 |
| 1,243,604 | Honeywell | Oct. 16, 1917 |
| 1,518,486 | Crews | Dec. 9, 1924 |
| 1,540,684 | Eades | June 2, 1925 |
| 1,982,528 | Mennesson | Nov. 27, 1934 |
| 2,037,731 | Mobley | Apr. 21, 1936 |
| 2,072,294 | Clemons | Mar. 2, 1937 |
| 2,370,040 | Jackson | Feb. 20, 1945 |